United States Patent
Baker et al.

(10) Patent No.: US 8,963,776 B2
(45) Date of Patent: Feb. 24, 2015

(54) SYSTEM AND METHOD FOR PRESENTING FLIGHT TRACKING DATA TO A USER BASED UPON THE USER'S ACCESS PERMISSIONS TO VARIOUS SOURCES

(71) Applicant: FlightAware, LLC, Houston, TX (US)

(72) Inventors: Daniel Baker, Houston, TX (US); Karl Lehenbauer, Houston, TX (US); David Cameron McNett, Austin, TX (US); Jeffrey A. Lawson, Austin, TX (US)

(73) Assignee: FlightAware, LLC, Houston, TX (US)

( * ) Notice: Subject to any disclaimer, the term of this patent is extended or adjusted under 35 U.S.C. 154(b) by 120 days.

(21) Appl. No.: 13/911,694

(22) Filed: Jun. 6, 2013

(65) Prior Publication Data
US 2014/0123315 A1 May 1, 2014

Related U.S. Application Data

(62) Division of application No. 13/662,809, filed on Oct. 29, 2012.

(51) Int. Cl.
G01S 3/02 (2006.01)
G01S 3/04 (2006.01)
G06F 21/62 (2013.01)
G08G 5/00 (2006.01)
H04L 29/06 (2006.01)
G06Q 10/00 (2012.01)
G01S 5/00 (2006.01)

(52) U.S. Cl.
CPC .......... *G06F 21/6218* (2013.01); *G01S 5/0009* (2013.01); *G08G 5/0026* (2013.01); *G06F 21/6227* (2013.01); *H04L 63/102* (2013.01); *G06Q 10/00* (2013.01); *G06F 2221/2101* (2013.01); *G06F 2221/2117* (2013.01); *G06F 2221/2119* (2013.01); *G06F 2221/2141* (2013.01)
USPC .......................................... 342/454; 342/456

(58) Field of Classification Search
USPC .......... 342/452, 454, 456, 464, 465; 701/119, 701/120; 726/28
See application file for complete search history.

(56) References Cited

U.S. PATENT DOCUMENTS

| 6,792,340 | B2 | 9/2004 | Dunsky et al. |
| 7,472,191 | B2 | 12/2008 | Stewart et al. |
| 7,612,716 | B2 | 11/2009 | Smith et al. |
| 8,068,039 | B2 | 11/2011 | Cole et al. |

*Primary Examiner* — Dao Phan
(74) *Attorney, Agent, or Firm* — Woodard, Emhardt, Moriarty, McNett & Henry LLP

(57) ABSTRACT

A computer-implemented system and method for the processing and presentation of flight tracking data from a number of sources, with at least one source include a user access restriction, is disclosed. Substantially real-time flight tracking data is received over a digital network from a number of different sources and is stored in at least a database. Various determined flight paths are stores for a single flight based upon the number of flight data sources contributing data regarding that flight. Upon receiving a query from a user, the user's access with respect to the available data providers in retrieved and the best flight for the selected flight which is determined only from data that the requested user is authorized to access is presented. In one form, the results may be presented to the user in the form of digital map having an aircraft image and historical flight path shown.

11 Claims, 6 Drawing Sheets

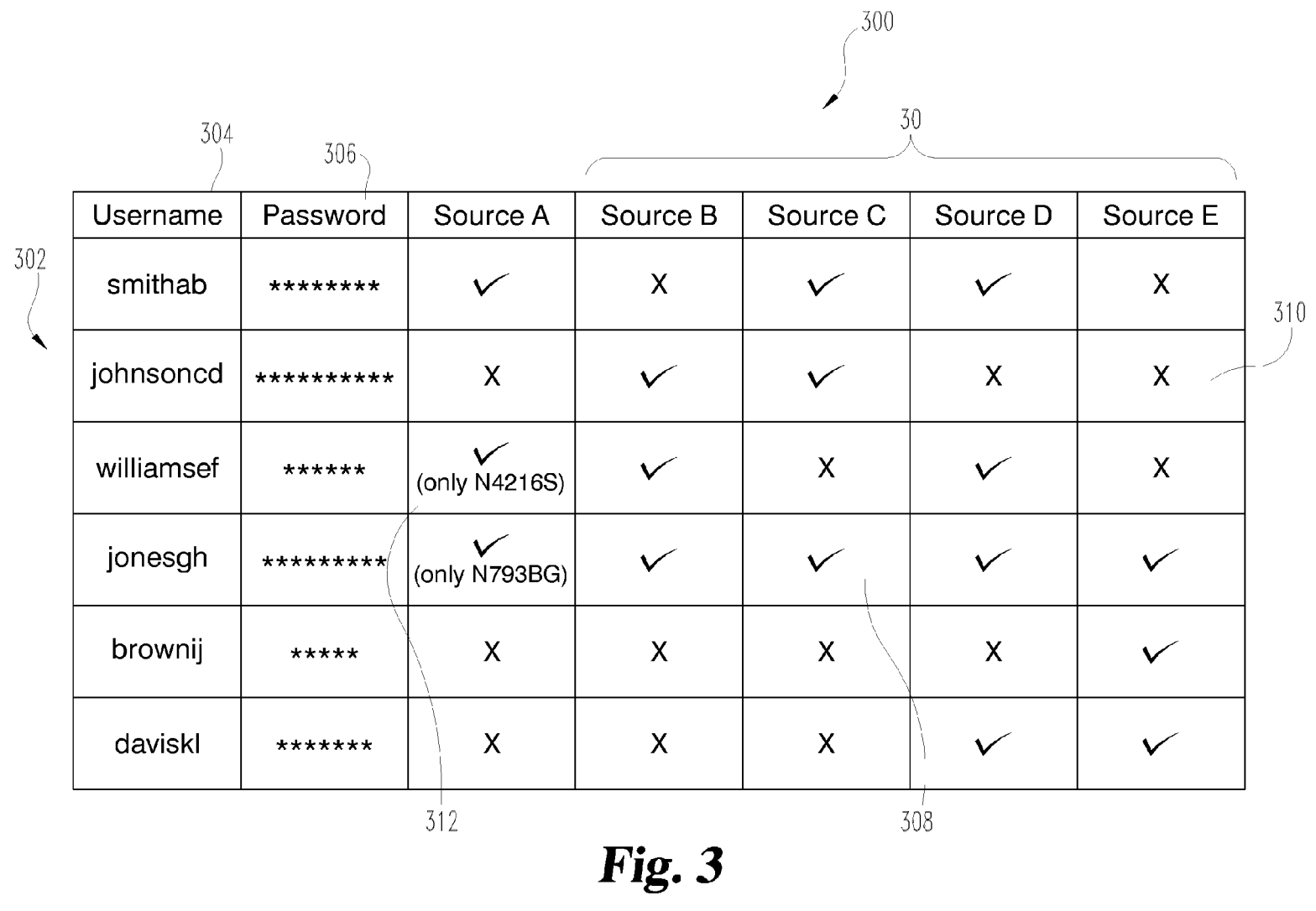

| Username | Password | Source A | Source B | Source C | Source D | Source E |
|---|---|---|---|---|---|---|
| smithab | ******** | ✓ | x | ✓ | ✓ | x |
| johnsoncd | ********** | x | ✓ | ✓ | x | x |
| williamsef | ******* | ✓ (only N4216S) | ✓ | x | ✓ | x |
| jonesgh | ********* | ✓ (only N793BG) | ✓ | ✓ | ✓ | ✓ |
| brownij | ***** | x | x | x | x | ✓ |
| daviskl | ******** | x | x | x | ✓ | ✓ |

*Fig. 3*

SYSTEM AND METHOD FOR PRESENTING FLIGHT TRACKING DATA TO A USER BASED UPON THE USER'S ACCESS PERMISSIONS TO VARIOUS SOURCES

CROSS-REFERENCE TO RELATED APPLICATIONS

This application is a divisional of U.S. application Ser. No. 13/662,809, filed Oct. 29, 2012, which is hereby incorporated by reference in its entirety.

FIELD OF THE INVENTION

The present invention generally relates to a system and method for receiving and processing flight tracking data from sources having differing access restrictions for presentation to a plurality of users having different access authorizations. More particularly, the present invention pertains to a system and method for receiving and processing flight tracking data from a number of public and private data sources for presentation to users based upon their level of access to those data sources.

BACKGROUND

In 1995, the United States Federal Aviation Administration (FAA) made a wealth of minute-by-minute radar-based flight tracking data available for distribution to the public with the creation of the Aircraft Situation Display to Industry (ASDI) service. Through this service, flight tracking data is made available to several vendors from a single source. The ASDI information includes the location, altitude, airspeed, origin, destination, estimated time of arrival, tail number, and other data. As a result of the availability of ASDI data, several publically available flight tracking services developed, including several located on the Internet, such as FlightAware.com.

In addition, other sources of flight tracking data are available which may be utilized independently or in combination with the ASDI data to provide flight tracking data to the public. For example, automatic dependent surveillance broadcast (ADS-B) information provides real-time position information that is, in many cases, more accurate than the information available with traditional radar-based systems or from the ASDI service. ADS-B uses GPS signals along with aircraft avionics to transmit an aircraft's location from an on-board transceiver directly to other aircraft as well as to permanent receivers located on the ground. The ground receivers then transmit that information to air traffic controllers, or back to cockpit displays of aircraft equipped with ADS-B avionics, and the like. An aircraft equipped with ADS-B also periodically broadcasts other relevant information such as the aircraft's identification, altitude, and velocity. Currently, this information is broadcast approximately every second.

Additional sources of flight tracking data exist, including EUROCONTROL, the European Organisation for the Safety of Air Navigation, based in Brussels, Belgium, ARINC Incorporated, based in Annapolis, Md., and Airservices Australia, based in Canberra, Australia. Other sources may include government sources, air navigation service providers, airlines, airports, satellite or radio-based tracking operators, and other private entities. However, many of these sources are only willing to provide their data to flight tracking services under agreements requiring that it be shared only with authorized users. Additionally, in the case of certain foreign governments, flight tracking data is provided only for use for specific purposes, such as in conjunction with end users, and thus may not be shared with resellers.

Each potential source of flight tracking data is susceptible of error, inaccuracy and imprecision as to time as well as to aircraft location, heading, altitude, speed, identification, and associated flight plan. Certain data sources are additionally constrained in their geographic coverage, such as by technical limitations or by law. The ability to receive data from many different sources is advantageous. However, when one or more of those sources provides its flight tracking data with a defined access restriction, providing flight tracking data to users becomes a difficult task, as one user may be entitled to view data that is developed using restricted information while another may not.

SUMMARY

Various technologies and techniques are disclosed for receiving, processing, and displaying flight tracking data collected from a number of substantially real-time sources, with at least one source having a restrictive user access requirement. In one embodiment, the flight tracking data service stores two or more routes for a single flight, wherein one route is calculated using data received from a first subset of the data sources while a second route is calculated using data received from a second distinct subset of the data sources and having different access restrictions.

In another embodiment, the service splits at least a first flight path for a flight into two distinct paths going forward based upon the receipt of flight tracking data for the flight from an additional data service having a different user access restriction than that currently applicable to the first flight path. In a further form, data from the tracking of the first route is copied to become a part of a newly created second route after receipt of flight tracking data from a new data source having different access restrictions than the data used to track the first route.

Ideally, each user would be best served by being able to use data from every source to which he has access, and then the user could receive information determined with access to all available data for which the user has permission, while other users using the same system but who have different data restrictions could receive different information synthesized from the all available data for which that user has permission. Accordingly, the present invention solves problems present in the aviation information industry, as are illustrated in the descriptions that follow.

Yet other forms, embodiments, objects, advantages, benefits, features, and aspects of the present invention will become apparent from the detailed description and drawings contained herein.

This summary is provided to introduce a selection of concepts in a simplified form that are described in further detail in the detailed description and drawings contained herein. This summary is not intended to identify key features or essential features of the claimed subject matter, nor is it intended to be used as an aid in determining the scope of the claimed subject matter. Yet other forms, embodiments, objects, advantages, benefits, features, and aspects of the present invention will become apparent from the detailed description and drawings contained herein.

BRIEF DESCRIPTION OF THE DRAWINGS

FIG. 3 is a representative example of a logical table indicating user access permissions for use by one embodiment of the present system and method illustrated in FIG. 1.

DETAILED DESCRIPTION

Figure 1:
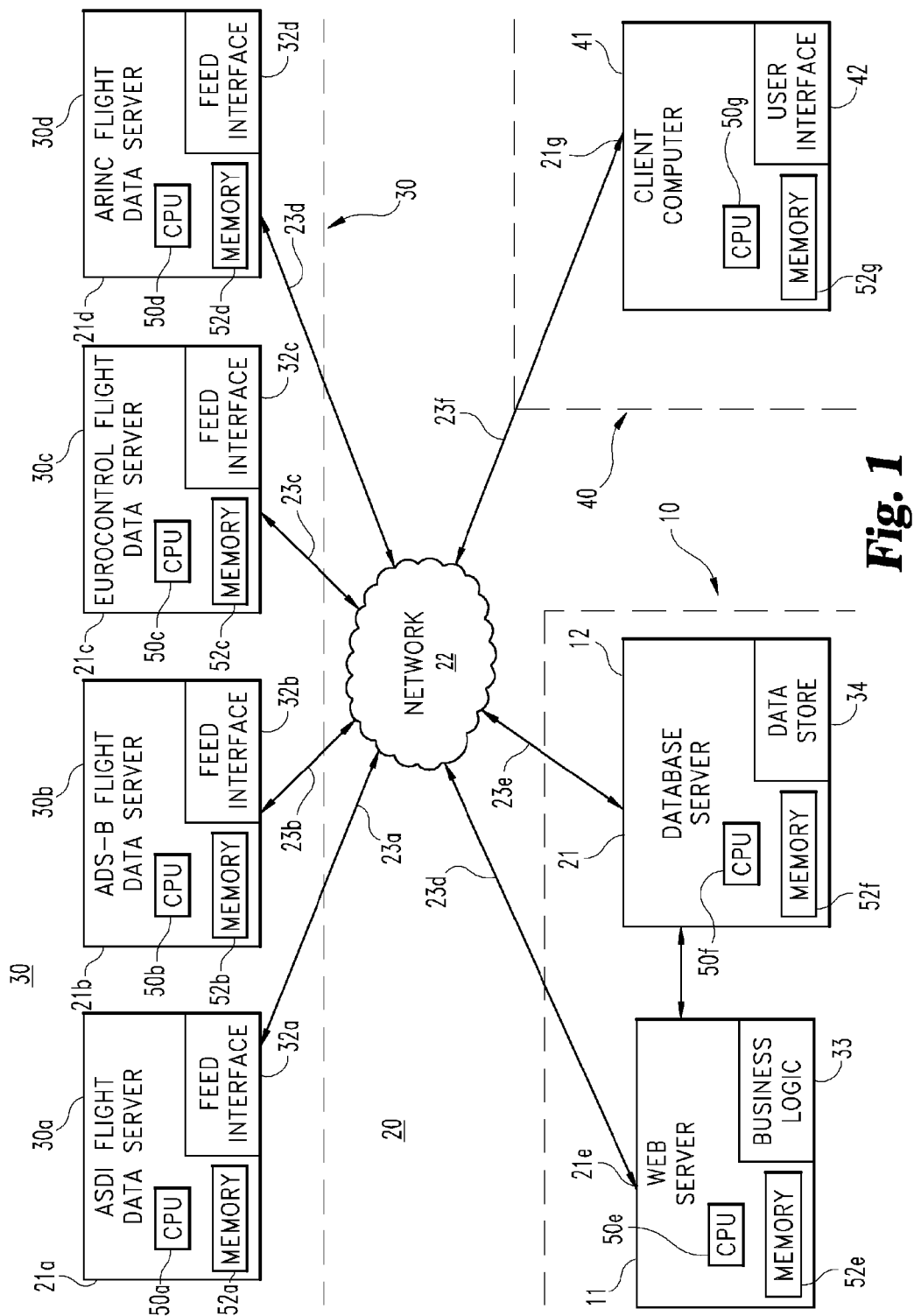
FIG. 1 is a diagrammatic view of a computer system of one implementation of the present system and method.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 is a diagrammatic view of computer system 20 of one embodiment of the present invention. In the illustrative embodiment, computer system 20 includes aviation information service 10, flight tracking data sources 30, and a user base 40. Computer system 20 also includes computer network 22. Computer network 22 couples together a number of computers 21a-21g over network pathways 23a-23g, respectively. More specifically, system 20 includes several servers, namely Web Server 11 and Database Server 12 of aviation information service 10. System 20 also includes computers that function as Flight Data Servers, namely one for ASDI 21a, ADS-B 21b, EUROCONTROL 21c, and ARINC 21d, which, for purposes of this embodiment, are each operated by their corresponding flight tracking data sources 30a-b, respectively. While computers 21a-21g are each illustrated as being a server or client, it should be understood that any of computers 21a-21g may be arranged to include both a client and server. Furthermore, it should be understood that while seven computers 21a-21g are illustrated, more or fewer may be utilized in alternative embodiments. Preferably, service 10 includes a collection of Web servers 11 for reliability and redundantly receiving, processing, and responding to user queries received from user base 40. Furthermore, each of flight tracking data sources 30 may include more than one server, as is currently shown for simplicity, or some other alternative data provider.

Computers 21a-21g include one or more processors or CPUs (50a, 50b, 50c, 50d, 50e, 50f and 50g, respectively) and one or more types of memory (52a, 52b, 52c, 52d, 52e, 52f and 52g, respectively). Each memory 52 preferably includes a removable memory device. Each processor 50 may be comprised of one or more components configured as a single unit. When of a multi-component form, a processor 50 may have one or more components located remotely relative to the others. One or more components of each processor 50 may be of the electronic variety defining digital circuitry, analog circuitry, or both. In one embodiment, each processor 50 is of a conventional, integrated circuit microprocessor arrangement, such as one or more OPTERON processors supplied by ADVANCED MICRO DEVICES Corporation of One AMD Place, Sunnyvale, Calif. 94088, USA.

Each memory 52 (removable, fixed or both) is one form of a computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types, or other types not included in the above list. Also, each memory may be volatile, nonvolatile, or a hybrid combination of volatile and nonvolatile varieties.

Although not shown (to preserve clarity), one or more of computers 21a-21g may be coupled to a display and/or may include an integrated display. Computers 21a-21g may be of the same type, or a heterogeneous combination of different computing devices. Likewise, displays may be of the same type, or a heterogeneous combination of different visual devices. Although again not shown to preserve clarity, each computer 21a-21g may also include one or more operator input devices such as a keyboard, mouse, track ball, light pen, and/or microtelecommunicator, to name just a few representative examples. Also, besides a display, one or more other output devices may be included such as a loudspeaker or printer. Various display and input device arrangements are possible.

Computer network 22 can be in the form of a wireless or wired Local Area Network (LAN), Municipal Area Network (MAN), Wide Area Network (WAN), such as the Internet, a combination of these, or such other network arrangement as would occur to those skilled in the art. The operating logic of system 20 can be embodied in signals transmitted over network 22, in programming instructions, dedicated hardware, or a combination of these. It should be understood that more or fewer computers like computers 21a-21g can be coupled together by computer network 22.

In one embodiment, system 20 operates at one or more physical locations. Web Server 11 is configured as a web server that hosts application business logic 33 for an aviation information engine, Database Server 12 is configured as a database server for storing aviation information provided by flight tracking data providers 30, and client computer 41, which represents user base 40, is configured to provide a user interface 42 for accessing the aviation information service 10. Preferably, Database Server 12 maintains at least a portion of data store 34 as a memory-resident database to provide more advanced searching functionality and minimize response times. User interface 42 of client computer 41 can be an installable application such as one that communicates with Web Server 11, can be browser-based, and/or can be embedded software, to name a few non-limiting examples. Client computer 41 may be one of many forms of computers, such as a mobile telephone, tablet, laptop, television, or the like.

In one embodiment, software installed locally on client computer 41, such as within memory 52g, a hard drive, or in another local storage medium, is used to communicate with Web Server 11. In another embodiment, Web Server 11 provides HTML pages, data from web services, and/or other Internet standard or company proprietary data formats to client computer 41 when requested. One of ordinary skill in the art will recognize that the term web server is used generically for purposes of illustration and is not meant to imply that network 22 is required to be the Internet. As described previously, network 22 can be one of various types of networks as would occur to one of ordinary skill in the art. Database (data store) 34 on Database Server 12 can store data such as flight tracking data, departure/arrival notices, flight plans, historical flight information, and/or aircraft information, to name a few representative examples.

In one embodiment, each of flight tracking data sources 30a-d operates a Flight Data Server 21a-d. Each Flight Data Server 21a-d includes a feed interface 32a-d which serves to facilitate the transmission of flight information, such as flight plan and/or flight tracking data, between itself and service 10. In the illustrative embodiment, flight tracking data source 30a is the Aircraft Situation Display to Industry Service (ASDI) provided by the Federal Aviation Administration (FAA) and its corresponding server 21a is the ASDI server connected to such service. The feed provided by the ASDI service may be in real time or delayed, such as subject to a five minute delay. Connections to the feed are established in a structured format according to *Aircraft Situation Display to Industry: Functional Description and Interface Control Document* (available at http://www.fly.faa.gov/ASDI/asdi.html) which is herein incorporated by reference in its entirety.

Typical applications of system 20 would include more client computers like computer 41 at various physical locations to make up user base 40, but only a single representative client computer 41 has been illustrated in FIG. 1 to preserve clarity. Furthermore, more or fewer flight tracking data providers 30 may be incorporated within service 10, with some having different user access permissions than others. For example, Eurocontrol Flight Data Server 21c and ARINC Flight Data Server 21d each have access restrictions that are different from each other and from the other flight data servers 21. Still further, although two servers 11 and 12 are shown, it will be appreciated by those of ordinary skill in the art that the one or more features provided by Web Server 11 and Database Server 12 could be provided by the same computer or varying other arrangements of computers at one or more physical locations and still be within the spirit of the invention. Farms of dedicated servers, a single proprietary system, and/or a Storage Area Network (SAN) could also be provided to support the specific features if desired. In the illustrative embodiment, in order to flexibly handle the large quantity of flight tracking data received by service 10, Database Server 12 includes a relational database, such as SQL, as in known to one of skill in the art.

Figure 2:
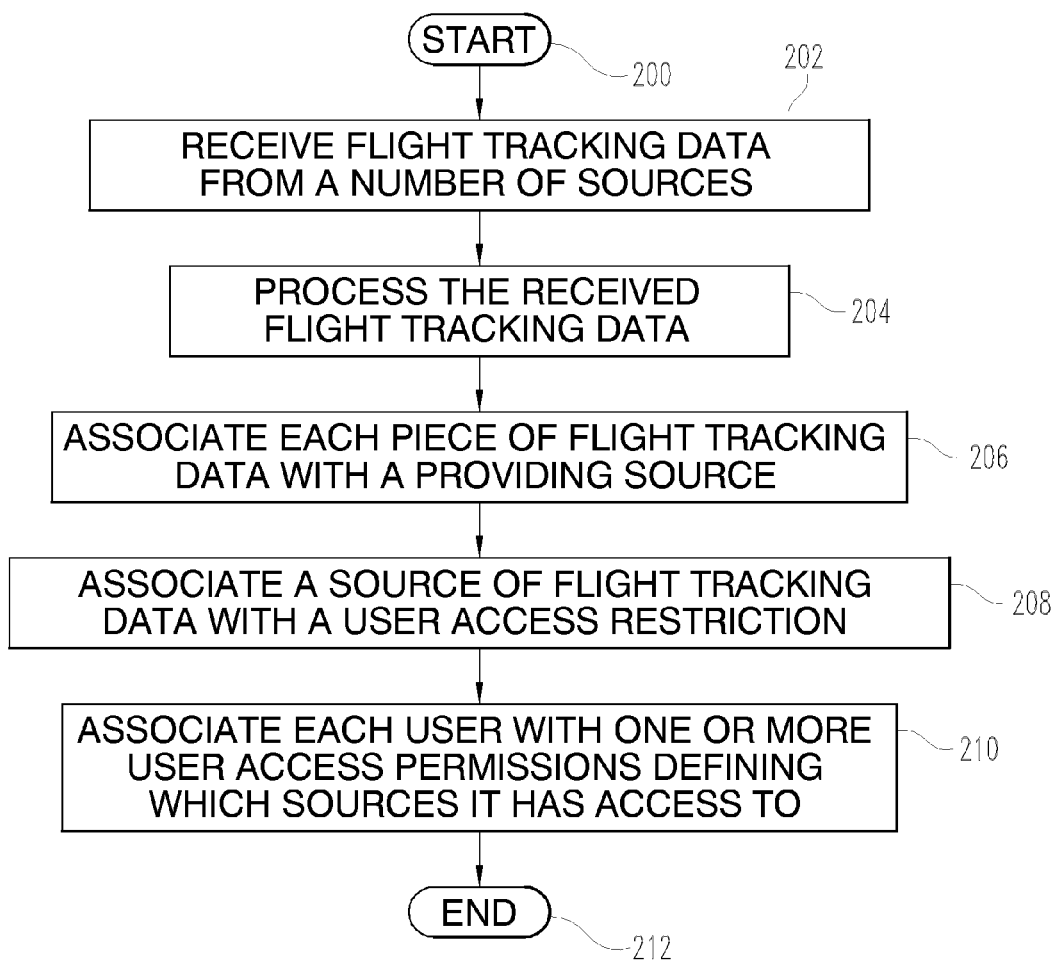
FIG. 2 is a process flow diagram demonstrating one example of the steps involved in receiving flight tracking data for subsequent presentation to a requesting user in one embodiment of the present system and method illustrated in FIG. 1.

Turning to FIG. 2, with continued reference to FIG. 1, a flowchart illustrating one example of a process of receiving flight tracking data for subsequent presentation to a requesting user to be used by aviation information service 10 is shown. The process will be described with respect to service 10 and flight tracking data sources 30, shown in FIG. 1. The process begins at start point 200 with the service 10 receiving flight tracking data from a number of sources (stage 202). In one form, the sources are flight tracking data sources 30, which provide substantially real-time flight tracking data. In a further form, the flight tracking data is provided by feed interfaces 32a-d of Flight Data Servers 30a-d. Alternatively, the flight tracking data may be provided in other suitable ways known to one of skill in the art, but preferably it is provided in a substantially real-time fashion. Once received, the flight tracking data provided by flight tracking data sources 30 is processed by service 10 (stage 204). In one form, this processing is performed by Database Server 12 of service 10 for storage within data store 34. In other forms, various other servers may process the data prior to its entry into data store 34 or some other suitable location. The flight tracking data may be received in any number of different formats, with each format providing various fields of information and being received at different frequencies. An example of how flight tracking data is received and processed from the ASDI feed provided by the FAA can be found in U.S. Patent Publication No. 2008/0065480 to Baker et al, the contents of which are hereby incorporated by reference to the extent not inconsistent. Similar processes for processing flight tracking data from other sources may be adapted from this process by those of skill in the art based upon the format specified by another data source.

In conjunction with storing the received flight tracking data, in one form, each position, update, or the like received from sources 30 is associated with the providing source (stage 206). Additionally, at some point in time and as appropriate depending on the source, data is associated with a user access restriction (stage 208), which controls which users may access the data. This may be a global restriction for the source or may be more detailed based upon the type of flight, the aircraft tail number, or other data provided. Either way, whether or not a user should be permitted to access to each piece of data is determinable from the source associated with it and the associated source's defined user access restriction. In order to serve data in accordance with the defined user access restrictions, service 10 builds and stores a collection of user access permissions (stage 210). A user access permission defines which, if any, users are authorized for a portion or all of the data provided by a specific source 30. For example, the most basic user access restriction provides for public or open dissemination of the information to any and all users, such as in the case of a public or open data source, such as the ASDI provided by the FAA. Other exemplary user access restrictions may require that: (1) a user be of the type authorized by the data source, such as by being documented as an approved end user; (2) a user be individually authorized by the data source (such as in the user access permissions) prior to accessing any data shared by the source; or (3) a user be specifically authorized for a specific aircraft by the data source prior to accessing data about that aircraft that was shared by the source. In a further form, a user may be authorized for one or more aircraft by a selected data source. In one form, the user access restrictions are specified by each individual source 30 and service 10 collaborates with the non-open sources 30 to store, in association with its user profiles, a user access permission for each source. This may include the user's entry of a specific authorization code provided by a source 30 to service 10, or some other suitable method of confirming authorization. A variety of such methods are known to those of skill in the art. The process ends at end point 212.

Turning to FIG. 3, with continued reference to FIGS. 1-2, a representative logical table 300 showing how user access permissions, such as those utilized in stage 210 of FIG. 2, may be stored by service 10. It shall be appreciated that table 300 may be stored electronically by service 10, such as in data store 34 or elsewhere. Table 300 includes a listing of users 302 by username 304. Also stored in conjunction with each user's username 304 is a corresponding password 306, which is preferably stored in a secure encrypted fashion. In one form, username 304 and password 306 are the log in credentials used by a user to access service 10. In the illustrated form, each user identified in table 300 also has stored therewith an indication of access authorization for each of the data sources 30 available to service 10. Accordingly, a check mark indicates that the user is authorized to view data from the source, such as in the case of box 308, which indicates user "jonesgh"'s authorization to view data provided by Source C. Alternatively, an "X" indicates that the user is not authorized to view data from the source, such as in the case of box 310, which indicates user "johnsoncd"'s lack of authorization to view data provided by Source E. In one further example, the check mark along with further restrictions indicates that the user is authorized to view only selected data from the source, such as in the case of box 312, which indicates user "williamsef"'s authorization to view data provided by Source A, but only that which is related to the aircraft identified by tail number "N4216S". Many other user access restrictions and permissions could be provided for use within service 10 and are contemplated herein. Furthermore, not all data sources 30 need be listed within table 300 as, for example, public or open data sources need not have individual or type user access authorizations as they inherently include a global authorization for all users.

Figure 4:
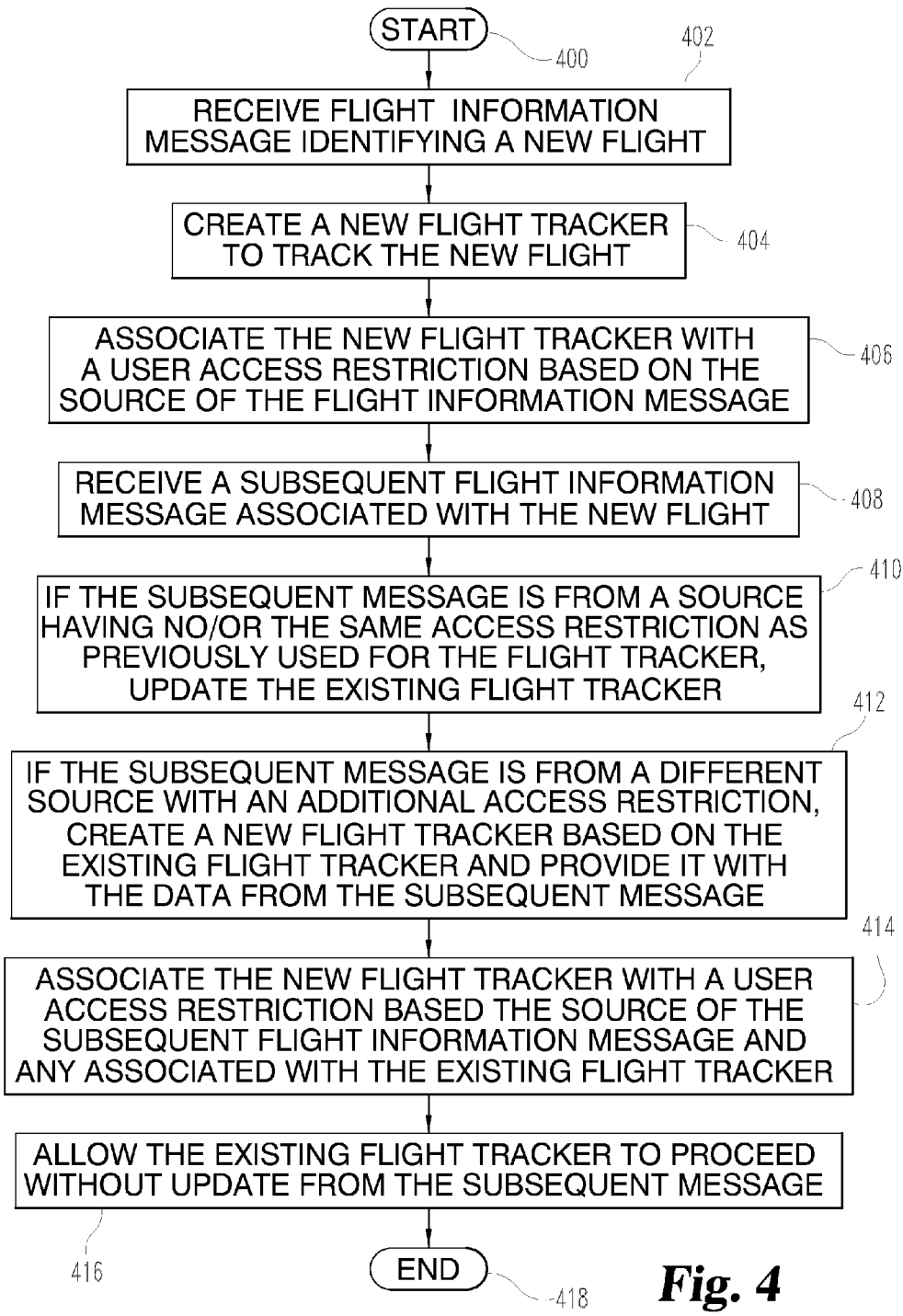
FIG. 4 is a process flow diagram demonstrating one example of the steps involved in processing the received flight tracking data in one embodiment of the present system and method illustrated in FIG. 1.

Illustrated in FIG. 4, with continued reference to FIGS. 1-3, is a flowchart showing one example of a process for processing the received flight tracking data by service 10. For ease of reference, each update from any of data sources 30, regardless of its form or content, shall be referred to herein as a flight tracking message. Furthermore, this process shall be illustrated with respect to a single flight, however, it shall be appreciated that any number of flight tracking messages containing data regarding any number of flights, which are also being tracked by service 10, may be processed in parallel and that FIG. 4 is simply illustrative of the sequential path of processing for a single flight. Examples of using this process with multiple flights would be to query all flights near an airport of interest or all flights operated by a particular air cargo company, or all flights within a geographic region.

The process begins at start point 400 with the service 10 receiving a flight information message from one of data sources 30 which identifies a new and previously untracked flight (stage 402). Upon receiving this message, service 10 establishes a new flight tracker for the flight which tracks the flight, including maintaining relevant information such as current airspeed, altitude, and the like (stage 404). A "flight tracker" is a logical representation of an actual flight stored by service 10. The flight tracker for the flight preferably keeps a history of past estimated locations and determines a predicted path for the flight based on prior positions received and other information received about the flight which it is provided. For purposes of understanding this disclosure, we will consider the situation where the flight tracker is also associated with at least one user access restriction based upon the source 30 which provided the flight information message (stage 406). For example, if the original flight information message which led to the creation of the flight tracker were received by service 10 from the ASDI service 30*b* (an open source), then the user access restriction associated with the flight tracker would also be set to open, such that any user could view it. However, if the original flight information message which led to the creation of the flight tracker were received by service 10 from a non-open source, such as EuroControl 30*c*, then the user access restriction associated with the flight tracker would also be set to the user access restriction set by the proving source, such that only users who have access to that source could view it.

As subsequent flight information messages which related to the flight are received by service 10, service 10 identifies each flight tracker currently associated with that flight, and determines whether or not the new message received is from a data source which has not previously provided information to that flight tracker (stage 408). If an existing flight tracker is found with respect to the flight which has access to data from the providing data source, or has access to data from a source which has the same user access restriction as the providing source, then the contents of the new message are provided to it and the flight tracker is updated (stage 410). In the event that an existing flight tracker is found with respect to the flight, but the source of the new message, such as ARINC 30*d*, has a different user access restriction and has not previously provided data regarding the flight to that flight tracker, then a new flight tracker is established, or forked, from that existing flight tracker and the new flight tracker is populated with the contents of the prior flight tracker (stage 412) plus the contents of the flight information message from the new data source, such as ARINC 30*d*. The new flight tracker inherits any user access restrictions from the prior flight tracker, such as those from the sources which contributed data to it, and then it is also associated with the user access restriction of the source of the new message (stage 414). The prior flight tracker is left to proceed absent the information received in the new message (stage 416). The process ends at end point 418.

This process results in the creation of a separate flight tracker for each combination of data sources 30 which have reported data for a flight and have differing levels of user access restrictions with respect to their data. For example, if three data sources each having distinct user access restrictions report data on a flight, then seven separate flight trackers will be kept such that the most accurate information can be provided to the user based upon what subset of the information is known to service 10 about the flight that is accessible by the user. Subsequently, if a new data source provides data to service 10 and has a restriction level that differs from all previously used data sources for that flight, then the seven existing trackers will continue, however, eight additional trackers will be created based upon the new possible data source combinations. In a further form, if two separate data sources have identical user access restrictions, then they may be treated as the same for purposes of at least this process to reduce on the number of flight trackers required. In the context of this process, the restriction requirements that lead to separate flight trackers have to do with general restrictions, not restrictions as to a specific aircraft. For a restriction limited to a specific aircraft, that is discerned by filtering among accessible flight trackers to thereafter display only the permitted aircraft from that flight tracker, and obtaining such other flight tracking information from the best available other flight tracking information that the user has permission to display.

In use, service 10 commonly receives data from a new data source upon the flight entering a new geographic area which is covered by the new source. Accordingly, very few situations, if any, exist where data will be received from a large number of the available sources 30 at the same time.

For example, a flight from New York to London may begin based upon data from the ASDI and ADS-B services in New York, then be supplemented by data from a satellite operator such as ARINC, then lose the ASDI and ADS-B services and continue with ARINC following, then later received data from EuroControl, and then even later ADS-B become available again as it nears London. Because both ASDI and ADS-B are unrestricted, the flight begins with a single flight tracker, and only as ARINC data becomes available, will a second flight tracker be established for a second more accurate, but restricted flight following. When data from EuroControl begins to arrive, then two additional flight trackers are established to address the different combinations then possible. The subsequent addition of ADS-B data upon nearing London does not require additional flight trackers because that data is not associated with a new level of restrictions.

It can be appreciated that as the number of data sources having different levels of restriction increases, the number of individual flight trackers increases dramatically. As such, in order to address this problem, service 10, according to a further form, may be implemented such that prior to creating a new flight tracker the service 10 reviews its user access permissions, such as those shown in FIG. 3, to ensure that the created combination of sources is one that fits the permissions of at least one user. If not, then the combination is not necessary and the flight tracker need not be created. Alternatively or additionally, the accuracy of the various data sources may be ranked and, in the event of a potential overload of the number of flight trackers, certain data sources may be omitted based upon the presence of a publicly accessible source which is perceived to be more accurate, or based upon the presence of a restricted data source which is equal to or more accurate than another restricted data source and is available to most if not all of the users who have access to the less accurate source.

Figure 5:
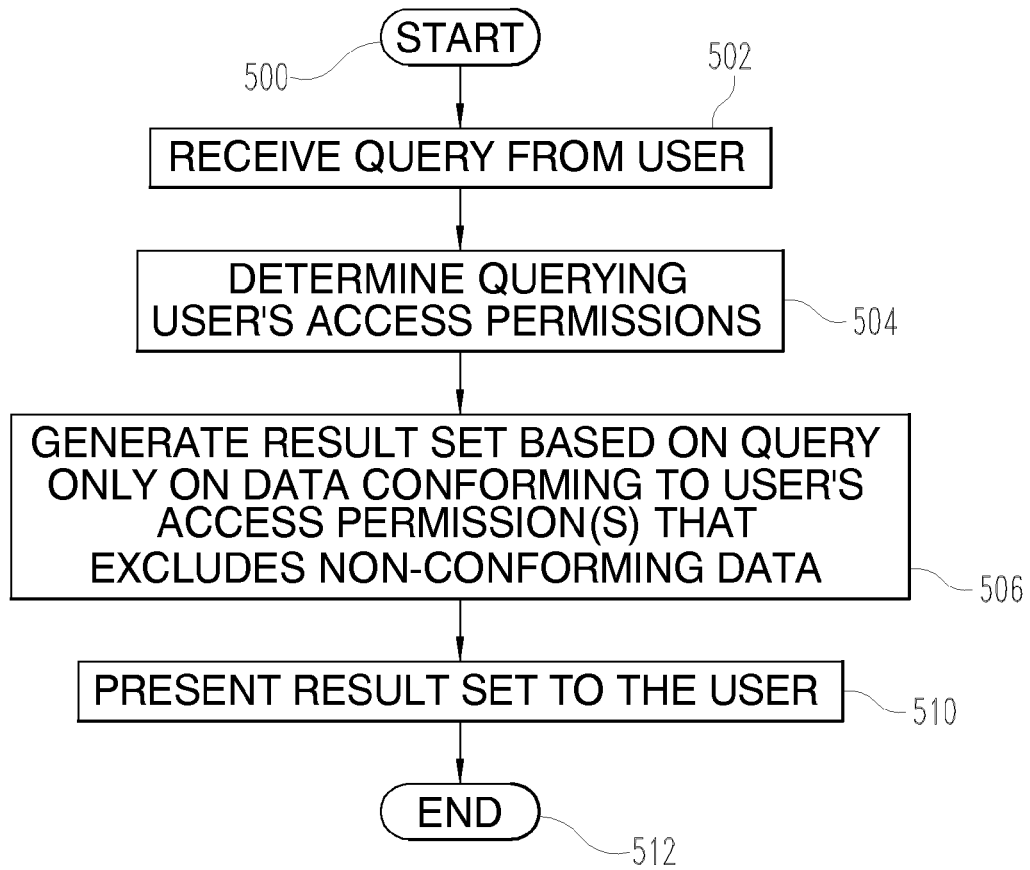
FIG. 5 is a process flow diagram demonstrating one example of the steps involved in receiving and responding to a request for flight tracking data from a user in one embodiment of the present system and method illustrated in FIG. 1.

Illustrated in FIG. 5, with continued reference to FIGS. 1-4, is a flowchart showing one example of a process for receiving and responding to a request for flight tracking data to be used by aviation information service 10 is provided. The process begins at start point 500 with the user submitting a query (stage 502) to the aviation information service 10, such as by using client computer 41 within user base 40. In one form, the query may be submitted using a web interface, such as user interface 42, and a predetermined structured format. The user query may include either a single term or a variety of terms in combination. These terms may include flight number, tail number, departure time, departure location, arrival time, arrival location, altitude, air speed, proximity to a specific location, and/or the class of airspace (whether uncontrolled Class G, or controlled Class A, B, C, D or E), to name a few examples. In a further form, the user may specify a desire to search either all, current, or completed flights in order to target the information desired. The query may also be a standing defined query, such as for use in feeding a live display of a certain airport, aircraft or a company's fleet or aircraft. For exemplary purposes, the remaining description of process 500 will presume that the query identifies a single flight. However, it shall be appreciated that this is being used as a simple example for demonstration purposes and that service 10 may handle a variety of queries which identify one or more aircraft or the like. Additionally, in one embodiment, the service 10 may require the user to log-in to the service in order to identify the user and enable searching based upon the user's stored access permissions. Additional forms of user identification, such as cookies, may also be utilized for this or other purposes.

Once the query is received by service 10 at Web Server 11, the service 10 determines the querying user's access permission (stage 504), such as by using table 300 stored by service 10. Once the user's access permissions are known, the query is parsed and executed upon the database of flight tracking data stored in data store 34, taking into account the user's access permission(s) that exclude data that the user is not permitted to access (stage 506). A result set is generated which may include a plurality of flight trackers which are associated with the flight identified in the query submitted by the user, all of which are limited to those the user is entitled to access. This may be handled in at least two ways. One way is to query all of the data while it is resident at a fully authorized operator's location, and then to filter the resultant query for transmission to the user. The other way is to first filter the data for delivery to the user base upon access level, and the user can then apply the query to that and immediately display the result. Whichever approach is taken, the results will be similar, with a difference being whether it is desired to distribute the searching process to user's computers, or to process all searches at the fully authorized operator's location. In any event, the user never has access to data which is not within the user's authority to see, as determined by table 300.

Once the result set is selected, it is presented to the user in a convenient form, such as via display on their remote computer (stage 510). The user is able to interact with the result set by sorting the results, clicking on individual results to obtain more information, or refine their query. In a further form, the result set is initially displayed to the user in visual form. The query process ends at end point 512.

Figure 6:
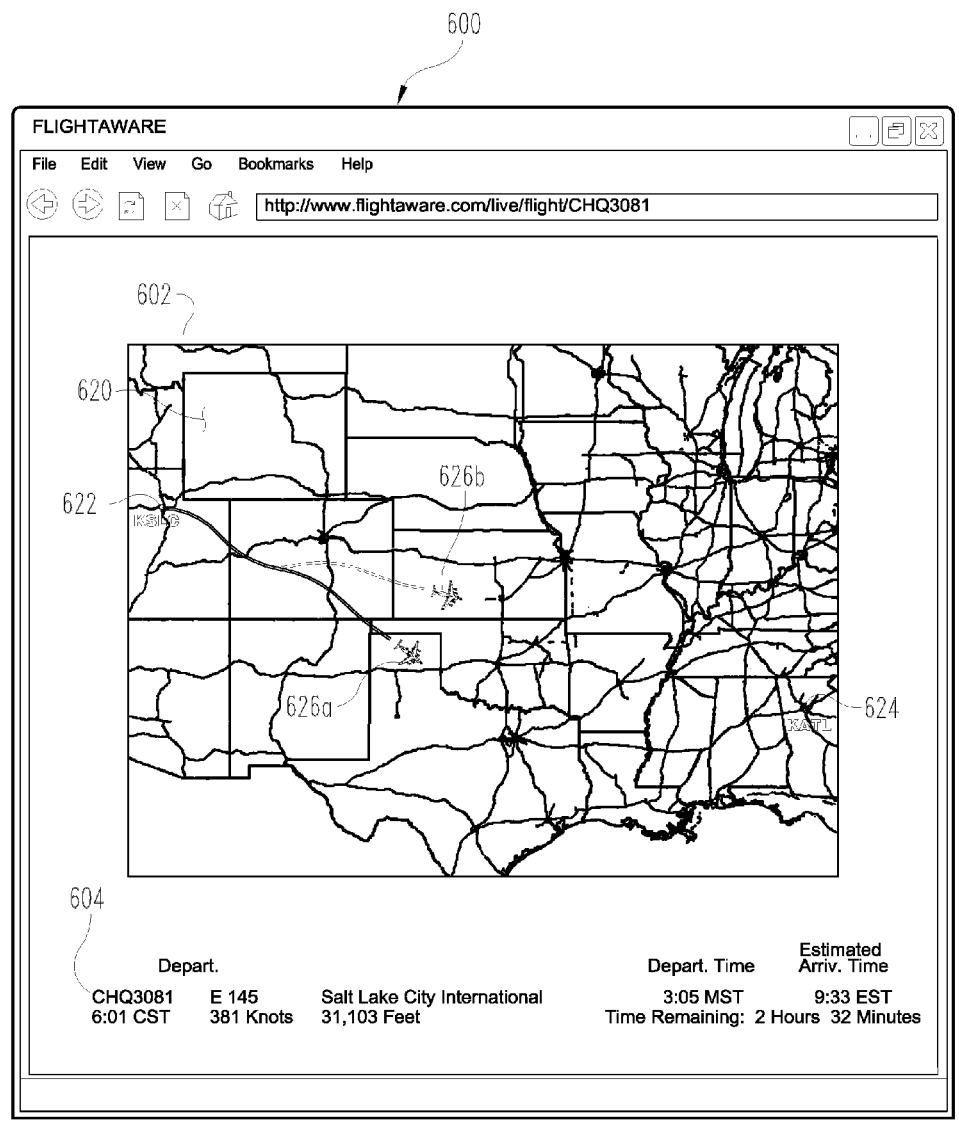
FIG. 6 is a diagrammatic view of a result displayed to a user in one form of the present system and method illustrated in FIG. 1.

FIG. 6 illustrates a representative web-page presented by service 10 in response to a specific flight query. In this illustrative example, the query requests a flight from Salt Lake City, Utah that is en route to Atlanta, Ga. The result is displayed on web page 600 having main display portion 602, and a result display portion 604. Main display portion 602 includes a two-dimensional electronic map 620 which may be a standard map, a topographical map, a political map, an IFR or VFR aeronautical chart, an aerial photography map, or any other type of map or combination of maps or overlays known to one of skill in the art. The map includes departure airport 622 and intended arrival 624. Flight tracker 626a illustrates the flight path presented to the user as a result of being the result set, with the aircraft oriented to properly indicate the heading of the aircraft in flight. However, flight tracker 626b, shown in broken lines as it would not be displayed to the user, represents an alternate flight tracker known to service 10 which is based upon data from at least one source which the user presented with web page 600 does not have access to. However, had the requesting user had access to this source, then flight tracker 626b may well have been presented to the user as opposed to flight tracker 626a. It shall be appreciated that the divergence of the paths and positions shown by flight tracker 626a and 626b of FIG. 6 is quite large and is not typical; however, it has been exaggerated here for ease of illustration.

The result portion 604 displays several key pieces of information concerning the results identified by the service 10 based on the user submitted query. For example, identifying information, current airspeed, current altitude, flight time, and estimated flight time remaining may be provided.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected. Hence, the proper scope of the present invention should be determined only by the broadest interpretation of the appended claims so as to encompass all such modifications as well as all relationships equivalent to those illustrated in the drawings and described in the specification.

What is claimed is:

1. A method for storing flight tracking data received from a number of sources comprising the steps of:
   receiving first flight tracking data from a first substantially real-time source;

determining a first flight path for a first flight using at least a portion of said first flight tracking data;

receiving second flight tracking data regarding said first flight from a second substantially real-time source, wherein said second source includes a user access restriction, different from any associated with said first source, such that only certain authorized users are permitted to access the second flight tracking data;

determining, in response to said receiving second flight tracking data, a second flight path for said first flight using said portion of said first flight tracking data and said second flight tracking data; and storing said first flight path and said second flight path in an electronic database.

2. The method of claim 1, further comprising the steps of:
receiving updated first flight tracking data from said first substantially real-time source; and
updating said first flight path for said first flight using said updated first flight tracking data.

3. The method of claim 2, further comprising the steps of:
receiving updated second flight tracking data from said second substantially real-time source; and
updating said second flight path for said first flight using said first updated flight tracking data and said second updated flight tracking data.

4. The method of claim 3, wherein at least one of said plurality of substantially real-time sources is the FAA Aircraft Situation Display to Industry service.

5. The method of claim 3, wherein said flight tracking data is delayed by less than approximately 5 minutes.

6. The method of claim 3 further comprising the steps of:
storing a plurality of user accounts, wherein a first user account includes authorization information indicating which of the first and second sources the user is authorized to access information from;
receiving a request for flight tracking data associated with said first flight from a user associated with one of said plurality of user accounts through a digital network;
presenting either said first or said second flight path to the user, based upon said authorization information, using said digital network.

7. The method of claim 6, wherein said digital network comprises the Internet.

8. The method of claim 7, wherein said presenting includes displaying at least a portion of said first or said second flight path on a web-page.

9. The method of claim 1 further comprising the steps of:
storing a plurality of user accounts, wherein a first user account includes authorization information indicating which of the first and second sources the user is authorized to access information from;
receiving a request for flight tracking data associated with said first flight from a user associated with one of said plurality of user accounts through a digital network;
presenting either said first, second, or third flight path to the user, based upon said authorization information, using said digital network.

10. The method of claim 1, wherein at least one of said plurality of substantially real-time sources is the FAA Aircraft Situation Display to Industry service.

11. The method of claim 1, wherein said flight tracking data is delayed by less than approximately 5 minutes.

* * * * *